(12) United States Patent
Shinbara

(10) Patent No.: US 11,318,703 B2
(45) Date of Patent: May 3, 2022

(54) COSMETIC SHEET AND COSMETIC PLATE

(71) Applicant: Dai Nippon Printing Co., Ltd., Tokyo (JP)

(72) Inventor: Yuuhei Shinbara, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 55 days.

(21) Appl. No.: 15/759,970

(22) PCT Filed: Sep. 30, 2016

(86) PCT No.: PCT/JP2016/079007
§ 371 (c)(1),
(2) Date: Mar. 14, 2018

(87) PCT Pub. No.: WO2017/057673
PCT Pub. Date: Apr. 6, 2017

(65) Prior Publication Data
US 2018/0257328 A1 Sep. 13, 2018

(30) Foreign Application Priority Data
Sep. 30, 2015 (JP) .............................. JP2015-194143

(51) Int. Cl.
*B32B 3/30* (2006.01)
*B32B 7/12* (2006.01)
(Continued)

(52) U.S. Cl.
CPC ................. *B32B 3/30* (2013.01); *B32B 7/02* (2013.01); *B32B 7/12* (2013.01); *B32B 27/08* (2013.01);
(Continued)

(58) Field of Classification Search
CPC .. B32B 3/30; B32B 7/02; B32B 27/20; B32B 27/32; B32B 27/08; B32B 7/12;
(Continued)

(56) References Cited

U.S. PATENT DOCUMENTS 9,040,145 B2 * 5/2015 Lyons .................... B29C 59/025
428/141
2008/0113182 A1 * 5/2008 MacQueen .............. C09D 7/69
428/323
(Continued)

FOREIGN PATENT DOCUMENTS

EP 3098071 A1 11/2016
EP 3446873 A1 2/2019
(Continued)

OTHER PUBLICATIONS

Supplementary European Search Report dated May 3, 2019 for EP patent application No. 16851842.1.
(Continued)

*Primary Examiner* — Nathan L Van Sell
(74) *Attorney, Agent, or Firm* — Locke Lord LLP

(57) ABSTRACT

An object of the present invention is to provide, for use in living environments, a decorative sheet that has excellent, easy cleanability and excellent impact resistance and from which dirt due to the adherence of a daily used contaminant, such as fine particle powder, that is not easy to clean is easily removed. The present invention provides a decorative sheet having a surface-protecting layer on the uppermost surface thereof, wherein (1) Ra(i)/Ra(ii) is 0.62 or more and 1.63 or less, the Ra(i)/Ra(ii) being calculated using an arithmetic average roughness Ra(i) measured along an arbitrary direction on the surface of the surface-protecting layer, and an arithmetic average roughness Ra(ii) measured along the perpendicular direction to the arbitrary direction.

14 Claims, 1 Drawing Sheet

(51) Int. Cl.
*B32B 27/08* (2006.01)
*B32B 27/32* (2006.01)
*B32B 33/00* (2006.01)
*E04F 15/16* (2006.01)
*E04F 13/00* (2006.01)
*E04F 13/08* (2006.01)
*E04F 15/10* (2006.01)
*B32B 27/20* (2006.01)
*B32B 7/02* (2019.01)
*E04F 15/12* (2006.01)

(52) U.S. Cl.
CPC .............. *B32B 27/20* (2013.01); *B32B 27/32* (2013.01); *B32B 33/00* (2013.01); *E04F 13/002* (2013.01); *E04F 13/0866* (2013.01); *E04F 15/107* (2013.01); *E04F 15/12* (2013.01); *E04F 15/16* (2013.01); *B32B 2255/10* (2013.01); *B32B 2255/26* (2013.01); *B32B 2255/28* (2013.01); *B32B 2307/402* (2013.01); *B32B 2307/412* (2013.01); *B32B 2451/00* (2013.01); *B32B 2471/00* (2013.01); *B32B 2607/00* (2013.01)

(58) Field of Classification Search
CPC . B32B 33/00; B32B 2607/00; B32B 2471/00; B32B 2451/00; B32B 2307/412; B32B 2307/402; B32B 2255/28; B32B 2255/26; B32B 2255/10; E04F 15/12; E04F 15/16; E04F 15/107; E04F 13/0866; E04F 13/002

See application file for complete search history.

(56) References Cited

U.S. PATENT DOCUMENTS

2011/0111174 A1    5/2011  Nomura et al.
2013/0251948 A1*  9/2013  Lyons .................. B08B 17/065
                                           428/148

FOREIGN PATENT DOCUMENTS

| | | |
|---|---|---|
| JP | 2002-036446 A | 2/2002 |
| JP | 2010-234813 A | 10/2010 |
| JP | 2012-030525 A | 2/2012 |
| JP | 2014-019719 A | 2/2014 |
| JP | 2014-069507 A | 4/2014 |
| JP | 2014-184675 A | 10/2014 |
| JP | 2015-034462 A | 2/2015 |
| JP | 2015-077800 A | 4/2015 |
| WO | 2015/105168 A1 | 7/2015 |

OTHER PUBLICATIONS

International Search Report dated Dec. 27, 2016, issued for PCT/JP2016/079007.

* cited by examiner

COSMETIC SHEET AND COSMETIC PLATE

TECHNICAL FIELD

The present invention relates to a decorative sheet and a decorative plate.

BACKGROUND ART

Conventionally, decorative sheets are laminated on the surface of various articles in order to impart designability. For example, decorative sheets are laminated and used on the surface of wall-covering materials used for wall surfaces of buildings and floor decorative materials used for floors.

In using such decorative sheets in living environments, dirt accumulates due to the adherence of fine particle powder as a result of, for example, the spilling of a daily used contaminant, such as wheat flour. In particular, dirt made with daily-used fine particle powders mostly has a white color and is noticeable. Such dirt made with a powder adhering to the decorative sheet surface is a problem in that it is not easily removed by cleaning since the powder is fine and easily penetrates into irregularities on the decorative sheet surface.

To solve this problem, a decorative sheet is disclosed whose surface irregularities are specified so that the contaminant above does not easily enter recesses, thereby preventing a decrease in easy cleanability (a property referring to the ability to be easily cleaned) (Patent Literature (PTL) 1).

CITATION LIST

Patent Literature

PTL 1: JP2014-69507A

SUMMARY OF INVENTION

Technical Problem

Although the decorative sheet above has excellent, easy cleanability, there is still room for further improvement in easily removing dirt due to the adherence of fine particle powder.

When using decorative sheets in living environments, scratches may be formed due to the impact applied when an article is dropped onto the surface of the decorative sheet. For this reason, decorative sheets are required to have impact resistance.

Accordingly, for use in living environments, the development of a decorative sheet has been in demand that has excellent, easy cleanability and excellent impact resistance and from which dirt due to the adherence of a daily used contaminant, such as fine particle powder, that is not particularly easy to clean is easily removed.

An object of the present invention is to provide, for use in living environments, a decorative sheet that has excellent, easy cleanability and excellent impact resistance and from which dirt due to the adherence of a daily used contaminant, such as fine particle powder, that is not easy to clean is easily removed.

Solution to Problem

As a result of extensive research, the present inventor found that the above object can be achieved when a decorative sheet has, on its uppermost surface, a surface-protecting layer, and when the surface of the surface-protecting layer has a specific shape. The present invention has thus been completed.

More specifically, the present invention relates to the following decorative sheet.

1. A decorative sheet having a surface-protecting layer on the uppermost surface of the decorative sheet, wherein
(1) $Ra(i)/Ra(ii)$ is 0.62 or more and 1.63 or less, the $Ra(i)/Ra(ii)$ being calculated using an arithmetic average roughness $Ra(i)$ measured along an arbitrary direction on the surface of the surface-protecting layer, and an arithmetic average roughness $Ra(ii)$ measured along the perpendicular direction to the arbitrary direction, under measurement conditions in accordance with JIS B0633:2001 and by a measurement method in accordance with JIS B0601:2001;
(2) $RSm(i)/RSm(ii)$ is 0.75 or more and 1.33 or less, the $RSm(i)/RSm(ii)$ being calculated using a mean width of roughness profile elements $RSm(i)$ measured along an arbitrary direction on the surface of the surface-protecting layer, and a mean width of roughness profile elements $RSm(ii)$ measured along the perpendicular direction to the arbitrary direction, under measurement conditions in accordance with JIS B0633:2001 and by a measurement method in accordance with JIS B0601:2001; and
(3) an arithmetic average roughness Ra measured on the surface of the surface-protecting layer at a cutoff value ($\lambda c$) of 0.08 mm with an evaluation length of 0.4 mm by a measurement method in accordance with JIS B0601:2001 is 0.40 $\mu$m or less, and a mean width of roughness profile elements RSm measured on the surface of the surface-protecting layer at a cutoff value ($\lambda c$) of 0.08 mm with an evaluation length of 0.4 mm by a measurement method in accordance with JIS B0601:2001 is 22.90 $\mu$m or more.

2. The decorative sheet according to Item 1, wherein a resin constituting the surface-protecting layer is an ionizing radiation-curable resin.

3. The decorative sheet according to Item 1 or 2, wherein the surface-protecting layer contains an inorganic filler.

4. The decorative sheet according to Item 3, wherein the inorganic filler is at least one member selected from the group consisting of silica, alumina, and glass powder.

5. The decorative sheet according to any one of Items 1 to 4, further having a gloss-adjusting layer.

6. A decorative plate having an adherend on a surface opposite to the surface-protecting layer of the decorative sheet of any one of Items 1 to 5.

Advantageous Effects of Invention

For use in living environments, the decorative sheet of the present invention is easily cleaned to remove dirt due to the adherence of fine particle powder as a result of, for example, the spilling of a daily used contaminant, and has excellent, easy cleanability and excellent impact resistance. Therefore, the decorative sheet of the present invention is suitably used, in particular, for floors.

DESCRIPTION OF EMBODIMENTS

1. Decorative Sheet of the Present Invention

The decorative sheet of the present invention has a surface-protecting layer on the uppermost surface thereof, wherein
(1) $Ra(i)/Ra(ii)$ is 0.62 or more and 1.63 or less, the $Ra(i)/Ra(ii)$ being calculated using an arithmetic average roughness Ra(i) measured along an arbitrary direction on the surface of the surface-protecting layer, and an arithmetic average roughness Ra(ii) measured along the perpendicular direction to the arbitrary direction, under measurement conditions in accordance with JIS B0633:2001 and by a measurement method in accordance with JIS B0601:2001;

(2) RSm(i)/RSm(ii) is 0.75 or more and 1.33 or less, the RSm(i)/RSm(ii) being calculated using a mean width of roughness profile elements RSm(i) measured along an arbitrary direction on the surface of the surface-protecting layer, and a mean width of roughness profile elements RSm(ii) measured along the perpendicular direction to the arbitrary direction, under measurement conditions in accordance with JIS B0633:2001 and by a measurement method in accordance with JIS B0601:2001; and (3) an arithmetic average roughness Ra measured on the surface of the surface-protecting layer at a cutoff value (λc) of 0.08 mm with an evaluation length of 0.4 mm by a measurement method in accordance with JIS B0601:2001 is 0.40 μm or less, and a mean width of roughness profile elements RSm measured on the surface of the surface-protecting layer at a cutoff value (λc) of 0.08 mm with an evaluation length of 0.4 mm by a measurement method in accordance with JIS B0601:2001 is 22.90 μm or more.

For use in living environments, the decorative sheet having the above features is easily cleaned to remove dirt due to the adherence of fine particle powder as a result of, for example, the spilling of a daily used contaminant, and has excellent, easy cleanability and excellent impact resistance. Accordingly, the decorative sheet of the present invention is suitably used, in particular, for floors.

Figure 1:
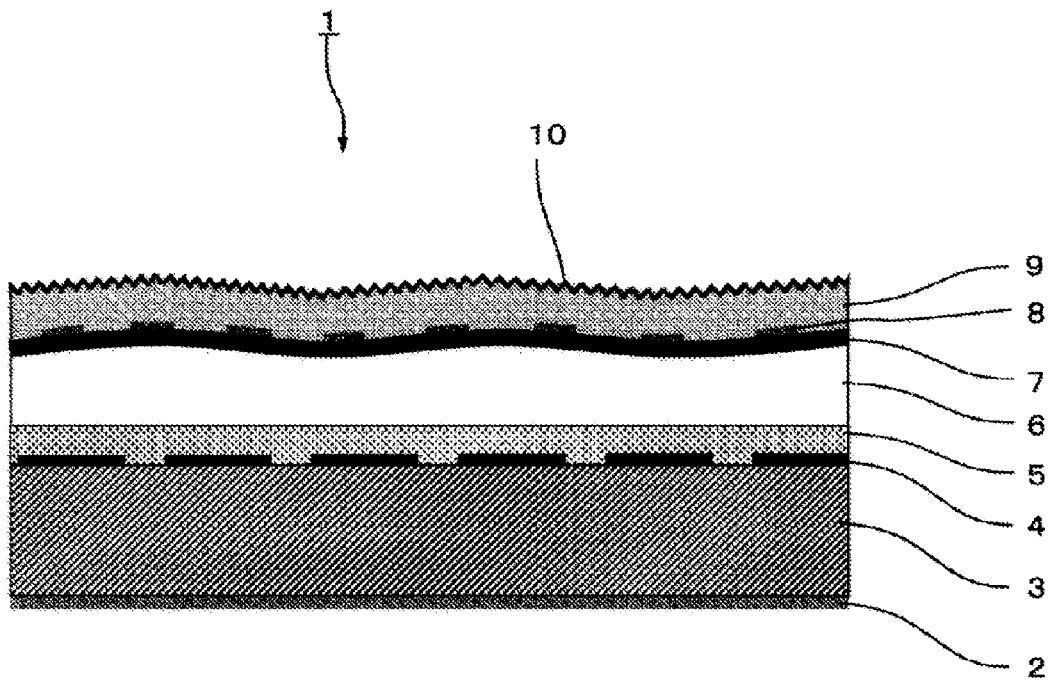
FIG. 1 is a cross-sectional view showing an example of the decorative sheet of the present invention.

FIG. 1 is a cross-sectional view showing an example of the sheet of the present invention. The sheet 1 of the present invention shown as an example in FIG. 1 has a surface-protecting layer 9 on the uppermost surface thereof. The surface-protecting layer 9 has a wavy shape as a concave-convex pattern. The surface-protecting layer 9 comprises a micro concave-convex surface shape 10 on its entire surface. In the decorative sheet of the present invention, the Ra(i)/Ra(ii) value defined in (1) above and the RSm(i)/RSm(ii) value defined in (2) above are adjusted to be within specific ranges, so that the surface-protecting layer 9 has a specific concave-convex pattern on its surface; and further, Ra and RSm defined in (3) above, measured at a cutoff value (λc) of 0.08 mm with an evaluation length of 0.4 mm, are adjusted to be within specific ranges, so that a specific surface shape is provided as the micro concave-convex surface shape 10 on the surface of the surface-protecting layer 9. Accordingly, this decorative sheet is easily cleaned to remove dirt due to the adherence of a contaminant, such as fine particle powder, that is not easily cleaned, allowing the sheet to have excellent, easy cleanability and excellent impact resistance.

Examples of the concavo-convex pattern include textile surface textures, plaster wall patterns, leather grain patterns, check patterns, bark patterns, grain patterns, stone sheet surface concave-convex patterns (granite cleavage planes, etc.), moth-eye patterns, and the like.

The decorative sheet of the present invention is described below in detail. In the decorative sheet of the present invention, the surface refers to a "front surface." When the decorative sheet of the present invention is laminated on an adherend or the like, the "front surface" is opposite to a surface that is in contact with the adherend. The front surface is perceptible to the eye after lamination. In this specification, the above surface side of the decorative sheet of the present invention is also referred to as "the front" or "above," and the opposite side is also referred to as "the back" or "below."

In this specification, the term "arbitrary" or "arbitrarily" is used when a decision can be freely made without restriction. For example, an "arbitrary direction" on the surface of the surface-protecting layer refers to any one direction on the surface of the surface-protecting layer and is not limited to only a specific direction such as longitudinal or transverse direction of the decorative sheet.

The decorative sheet of the present invention has a surface-protecting layer on its uppermost surface. The layer structure is not specifically limited as long as the surface-protecting layer has the surface shape as described in (1) to (3) above. For example, the decorative sheet may have a picture pattern layer, an adhesive layer, a transparent resin layer, a primer layer, and a surface-protecting layer sequentially laminated on a base material sheet. Using the decorative sheet having this layer structure as a representative example, each layer is described in detail below.

Surface-Protecting Layer

The decorative sheet of the present invention has a surface-protecting layer. The surface-protecting layer is provided as the uppermost surface layer of the decorative sheet.

According to the decorative sheet of the present invention, (1) Ra(i)/Ra(ii) is 0.62 or more and 1.63 or less, the Ra(i)/Ra(ii) being calculated using an arithmetic average roughness Ra(i) measured along an arbitrary direction on the surface of the surface-protecting layer, and an arithmetic average roughness Ra(ii) measured along the perpendicular direction to the arbitrary direction, under measurement conditions in accordance with JIS B0633:2001 and by a measurement method in accordance with JIS B0601:2001. When the Ra(i)/Ra(ii) is outside this range, the impact resistance is lowered. The Ra(i)/Ra(ii) is preferably 0.63 or more and 1.60 or less, and more preferably 0.64 or more and 1.56 or less.

In this specification, the Ra(i)/Ra(ii) is a value measured by the following measurement method.

First, a portion with a length of 5 cm and a width of 5 cm is arbitrarily selected on the surface of the surface-protecting layer of the decorative sheet. Within this portion, 5 points are arbitrarily selected to measure each arithmetic average roughness Ra in an arbitrarily given direction, under measurement conditions in accordance with JIS B0633:2001 and by a measurement method in accordance with JIS B0601:2001, and the average value of the 5 points is obtained as Ra(i).

Next, within the portion, 5 points are arbitrarily selected to measure each arithmetic average roughness Ra in the same manner in the direction perpendicular to the direction for measuring Ra(i) above, and the average value of the 5 points is obtained as Ra(ii). Finally, Ra(i)/Ra(ii) is calculated based on the Ra(i) and Ra(ii) values obtained accordingly.

According to the decorative sheet of the present invention, (2) RSm(i)/RSm(ii) is 0.75 or more and 1.33 or less, the RSm(i)/RSm(ii) being calculated using a mean width of the roughness profile elements RSm(i) measured along an arbitrary direction on the surface of the surface-protecting layer, and a mean width of the roughness profile elements RSm(ii) measured along the perpendicular direction to the arbitrary direction, under measurement conditions in accordance with JIS B0633:2001 and by a measurement method in accordance with JIS B0601:2001. When the RSm(i)/RSm(ii) is outside this range, the impact resistance is lowered. The RSm(i)/RSm(ii) is preferably 0.78 or more and 1.28 or less, and more preferably 0.80 or more and 1.25 or less.

In this specification, the RSm(i)/RSm(ii) is a value measured by the following measurement method.

First, a portion with a length of 5 cm and a width of 5 cm is arbitrarily selected on the surface of the surface-protecting layer of the decorative sheet. Within this portion, 5 points are arbitrarily selected to measure each mean width of the roughness profile elements RSm in an arbitrarily given direction, under measurement conditions in accordance with JIS B0633:2001 and by a measurement method in accordance with JIS B0601:2001, and the average value of the 5 points is obtained as RSm(i).

Next, 5 points are arbitrarily selected to measure each mean width of the roughness profile elements RSm in the same manner along the direction perpendicular to the direction for measuring the Rsm(i) above, and the average value of the 5 points is obtained as RSm(ii). Finally, RSm(i)/RSm(ii) is calculated based on the measured RSm(i) and RSm(ii) values.

According to the decorative sheet of the present invention, (3) an arithmetic average roughness Ra measured on the surface of the surface-protecting layer at a cutoff value ($\lambda$c) of 0.08 mm with an evaluation length of 0.4 mm by a measurement method in accordance with JIS B0601:2001 is 0.40 µm or less. If the arithmetic average roughness Ra measured at a cutoff value ($\lambda$c) of 0.08 mm with an evaluation length of 0.4 mm exceeds 0.40 µm, the easy cleanability is deteriorated. The Ra is preferably 0.35 µm or less. The lower limit of arithmetic average roughness Ra measured at a cutoff value ($\lambda$c) of 0.08 mm with an evaluation length of 0.4 mm is not limited, and is preferably 0.10 µm, and more preferably 0.15 µm. When the lower limit of Ra is this value, the decorative sheet of the present invention can exhibit yet more excellent, easy cleanability.

According to the decorative sheet of the present invention, (3) a mean width of the roughness profile elements RSm measured on the surface of the surface-protecting layer at a cutoff value ($\lambda$c) of 0.08 mm with an evaluation length of 0.4 mm by a measurement method in accordance with JIS B0601:2001 is 22.90 µm or more. If the mean width of the roughness profile elements RSm measured at a cutoff value ($\lambda$c) of 0.08 mm with an evaluation length of 0.4 mm is less than 22.90 µm, the easy cleanability is deteriorated. The RSm is preferably 30.00 µm or more. The upper limit of mean width of the roughness profile elements RSm measured at a cutoff value ($\lambda$c) of 0.08 mm with an evaluation length of 0.4 mm is not limited, and is preferably 80.00 µm, and more preferably 50.00 µm. When the upper limit of RSm is this value, the decorative sheet of the present invention can exhibit yet more excellent, easy cleanability.

The arithmetic average roughness Ra and RSm measured on the surface of the surface-protecting layer of the decorative sheet at a cutoff value ($\lambda$c) of 0.08 mm with an evaluation length of 0.4 mm are values measured by the following measurement method.

First, a portion with a length of 5 cm and a width of 5 cm is arbitrarily selected on the surface of the surface-protecting layer of the decorative sheet. Within this portion, 5 points are arbitrarily selected, and an arithmetic average roughness Ra(i) and a mean width of the roughness profile elements RSm(i) are measured in an arbitrarily given direction, by a measurement method in accordance with JIS B0601:2001 while setting the evaluation length to 0.4 mm and the cutoff value ($\lambda$c) of a surface roughness measuring apparatus to 0.08 mm.

Next, 5 points are arbitrarily selected, and an arithmetic average roughness Ra(ii) and a mean width of the roughness profile elements RSm(ii) are measured in a similar manner in the perpendicular direction to the arbitrarily given direction for measuring the Ra(i) and RSm(i) while setting the evaluation length to 0.4 mm and the cutoff value ($\lambda$c) of a surface roughness measuring apparatus to 0.08 mm. Finally, the average value of 10 points in total, i.e., the measured Ra(i) based on the 5 points and the measured Ra(ii) based on the 5 points, is calculated to obtain an arithmetic average roughness Ra measured at a cutoff value ($\lambda$c) of 0.08 mm with an evaluation length of 0.4 mm. Additionally, the average value of 10 points in total, i.e., the measured RSm(i) based on the 5 points and the measured RSm(ii) based on the 5 points, is calculated to obtain a mean width of the roughness profile elements RSm measured at a cutoff value ($\lambda$c) of 0.08 mm with an evaluation length of 0.4 mm.

The resin that constitutes the surface-protecting layer is preferably a curable resin, such as a thermosetting resin or an ionizing radiation-curable resin (e.g., an electron beam-curable resin). Ionizing radiation-curable resins are particularly preferable since they can improve scratch resistance by imparting high surface hardness, and achieve excellent productivity.

Examples of thermosetting resins include unsaturated polyester resins, polyurethane resins (including two-component curable polyurethane), epoxy resins, amino alkyd resins, phenol resins, urea resins, diallyl phthalate resins, melamine resins, guanamine resins, melamine-urea copoly-condensation resins, silicone resins, polysiloxane resins, and the like.

These resins may contain crosslinking agents, curing agents (e.g., polymerization initiators), and polymerization accelerators. Examples of curing agents include isocyanate, organic sulfonic acid salts, etc., which can be added to unsaturated polyester resins, polyurethane resins, etc.; organic amines, etc., which can be added to epoxy resins; peroxides, such as methyl ethyl ketone peroxide; and radical initiators, such as azoisobutylnitrile, which can be added to unsaturated polyester resins.

As the method for forming the surface-protecting layer using a thermosetting resin, for example, a solution of a thermosetting resin is applied by a coating method, such as roll coating or gravure coating, followed by drying and curing.

The ionizing radiation-curable resin is not limited, as long as it induces a crosslinking polymerization reaction upon irradiation with ionizing radiation and is converted into a three-dimensional polymer structure. For example, one or more types of prepolymers, oligomers, and monomers that have, in the molecule, a polymerizable unsaturated bond crosslinkable by irradiation with ionizing radiation, or an epoxy group can be used. Specific examples include acrylate resins, such as urethane acrylate, polyester acrylate, and epoxy acrylate; silicone resins, such as siloxane; polyester resins; epoxy resins; and the like.

Examples of ionizing radiation include visible rays, ultraviolet rays (near ultraviolet rays, vacuum ultraviolet rays, etc.), X rays, electron beams, ionic lines, etc. Of these, ultraviolet rays and/or electron beams are desirable.

Examples of the source of ultraviolet rays include ultra-high-pressure mercury lamps, high-pressure mercury lamps, low-pressure mercury lamps, carbon arc lamps, black-light fluorescent lamps, metal halide lamps, and like light sources. The wavelength of ultraviolet rays is about 190 nm or more and 380 nm or less.

Examples of the source of electron beams include various electron beam accelerators, such as Cockoroft-Walton, Van de Graaff, resonance transformer, insulated core transformer, linear, Dynamitron, and high-frequency accelerators. The energy of the electron beam is preferably about 100 keV or more and 1000 keV or less, and more preferably about 100 keV or more and 300 keV or less. The exposure dose of the electron beam is preferably about 2 Mrad or more and 15 Mrad or less.

Although the ionizing radiation-curable resin is sufficiently cured by irradiation with an electron beam, it is preferable to add a photopolymerization initiator (sensitizer) when the resin is cured by irradiation with ultraviolet rays.

The photopolymerization initiator used in the case of a resin having a radically polymerizable unsaturated group is, for example, at least one of acetophenones, benzophenones, thioxanthones, benzoin, benzoin methyl ether, Michler's benzoyl benzoate, Michler's ketone, diphenyl sulfide, dibenzyl disulfide, diethyl oxide, triphenyl biimidazole, isopropyl-N,N-dimethylaminobenzoate, and the like. Moreover, the photopolymerization initiator used in the case of a resin having a cation polymerizable functional group is, for example, at least one of aromatic diazonium salts, aromatic sulfonium salts, metallocene compounds, benzoin sulfonate, furyloxy sulfoxonium diallyliodosyl salts, or the like.

The amount of the photopolymerization initiator added is not particularly limited. The amount is generally about 0.1 parts by mass or more and 10 parts by mass or less, based on 100 parts by mass of the ionizing radiation-curable resin.

As the method for forming the surface-protecting layer using an ionizing radiation-curable resin, for example, a solution of the ionizing radiation-curable resin may be applied by a coating method, such as gravure coating or roll coating.

The surface-protecting layer of the decorative sheet of the present invention preferably contains an inorganic filler with the resin that constitutes the surface-protecting layer.

The inorganic filler is not particularly limited. Examples include silica, alumina, silicon carbide, silicon dioxide, calcium titanate, barium titanate, magnesium pyroborate, zinc oxide, silicon nitride, zirconium oxide, chromium oxide, iron oxide, boron nitride, diamond, emery, glass fiber, glass powder, and the like. Of these inorganic fillers, preferred are at least one member selected from silica, alumina, and glass powder.

To achieve easy cleanability, the inorganic filler content in the surface-protecting layer is preferably 0.1 parts by mass or more and 30 parts by mass or less, more preferably 0.5 parts by mass or more and 30 parts by mass or less, and still more preferably 5 parts by mass or more and 30 parts by mass or less, based on 100 parts by mass of the resin (resin component) that constitutes the surface-protecting layer.

The particle size (and average particle size) of the inorganic filler is not particularly limited. For example, an inorganic filler having a mode diameter (a particle size at a local maximum in a particle size distribution and the most frequently occurring particle size) of about 1 μm or more and 10 μm or less is preferable, and an inorganic filler having a mode diameter of about 2 μm or more and 4 μm or less is more preferable. The particle size (mode diameter) of the inorganic filler according to the present invention is a value measured by a light scattering method.

The inorganic filler may have the shape of, but is not particularly limited to, for example, spherical, cube, rods, plates, or needles.

The surface-protecting layer may further contain various additives, such as solvents, colorants (e.g., dyes and pigments), matting agents, fillers (e.g., extenders), antifoaming agents, leveling agents, and thixotropy-imparting agents, as required.

Examples of the method for forming a surface-protecting layer comprising an ionizing radiation-curable resin include (1) a method comprising applying a solution (a surface-protecting layer-forming resin composition) containing a resin (e.g., an ionizing radiation-curable resin), optionally an inorganic filler, other resins, an ultraviolet absorber, an antibacterial agent, the various additives mentioned above, and the like by a coating method, such as gravure coating or roll coating, followed by curing the ionizing radiation-curable resin.

The thickness of the surface-protecting layer is not particularly limited, and is suitably determined according to the characteristics of the final product. The thickness is preferably 0.1 μm or more and 50 μm or less, and more preferably 1 μm or more and 20 μm or less.

Base Material Sheet

The base material sheet is a layer on the surface (front surface) of which a picture pattern layer etc. are sequentially laminated. For example, the base material sheet is preferably a sheet (film) formed of a thermoplastic resin. Specific examples include polyethylene, ethylene-α olefin copolymers, polypropylene, polymethylpentene, polybutene, ethylene-propylene copolymers, propylene-butene copolymers, ethylene-vinyl acetate copolymers, saponified products of ethylene-vinyl acetate copolymers, ethylene-(meth)acrylic acid copolymers, ethylene-(meth)acrylic acid ester copolymers, and like olefin-based resins, polyvinyl chloride, polyethylene terephthalate, polybutylene terephthalate, polyamide, polycarbonate, polyethylene naphthalate, ionomers, acrylic acid ester-based polymers, methacrylic acid ester-based polymers, and the like. The base material sheet is formed by using these resins singly or in a combination of two or more. The term "(meth)acrylic acid" refers to acrylic acid and/or methacrylic acid; the same applies to other portions referring to "meth."

The base material sheet may be colored. In this case, the base material sheet can be colored by adding a colorant (pigment or dye) to a thermoplastic resin mentioned above. Examples of colorants include inorganic pigments, such as titanium dioxide, carbon black, and iron oxide; organic pigments, such as phthalocyanine blue; and various dyes. One or more such colorants may be selected from known or commercially available products. The amount of colorant(s) may be determined according to the desired color etc.

The base material sheet may contain various additives, such as fillers, matting agents, foaming agents, flame retardants, lubricants, antistatic agents, antioxidants, ultraviolet absorbers, and light stabilizers, as required.

The thickness of the base material sheet is suitably determined depending on the application of the final product, the method of use of the final product, etc. In general, the thickness of the base material is preferably 20 μm or more and 300 μm or less.

The surface (front surface) of the base material sheet may be subjected to a corona discharge treatment, if necessary, in order to increase the adhesion of the ink that forms the picture pattern layer etc. Methods and conditions for the corona discharge treatment may be determined according to known methods. If necessary, a corona discharge treatment may be performed on the back surface of the base material sheet, a picture pattern layer (i.e., back print) may be formed, or a back-surface primer layer, a backer layer, or the like mentioned later may also be formed.

Picture Pattern Layer

The decorative sheet of the present invention may have a picture pattern layer.

The picture pattern layer gives a desired picture (design) to the decorative sheet, and the type etc. of picture are not limited. Examples thereof include wood grain patterns, leather patterns, marble grain patterns, pebbly patterns, tiled patterns, brick-masonry patterns, textile patterns, geometric figures, characters, symbols, and abstract patterns.

The method of forming the picture pattern layer is not particularly limited. For example, the picture pattern layer may be formed on the surface of the base material sheet by a printing method that uses ink obtained by dissolving (or dispersing) a known colorant (dye or pigment) together with a binding resin in a solvent (or a dispersion medium). The ink can be an aqueous composition, in terms of reducing the VOC of the sheet.

Examples of colorants include inorganic pigments, such as carbon black, titanium white, zinc white, red oxide, Berlin blue, and cadmium red; organic pigments, such as azo pigments, lake pigments, anthraquinone pigments, quinacridone pigments, phthalocyanine pigments, isoindolinone pigments, and dioxazine pigments; metallic powder pigments, such as aluminum powder and bronze powder; pearlescent pigments, such as titanium oxide-coated mica and bismuth chloride oxide; fluorescent pigments; noctilucent pigments; and the like. Such colorants may be used singly or in a combination of two or more. These colorants may be used in combination with a filler (e.g., silica), an extender pigment (e.g., organic beads), a neutralizer, a surfactant, etc.

Examples of binding resins include hydrophilized polyester-based urethane resins, which can be used in combination with polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic anhydride copolymers, cellulose-based resins, etc. Specific examples include polyacrylamide-based resins, poly(meth)acrylate-based resins, polyethylene oxide-based resins, poly N-vinyl-pyrrolidone-based resins, water-soluble polyester-based resins, water-soluble polyamide-based resins, water-soluble amino-based resins, water-soluble phenol-based resins, and other water-soluble synthetic resins; polynucleotides, polypeptides, polysaccharides, and like water-soluble natural polymers; etc. Other examples include natural rubber, synthetic rubber, polyvinyl acetate-based resins, (meth)acrylic-based resins, polyvinyl chloride-based resins, modified polyurethane-polyacrylic-based resins, etc., mixtures of natural rubber and the like mentioned above, and other resins. These binding resins can be used singly or in a combination of two or more.

Examples of the solvent (or dispersion medium) include petroleum-based organic solvents, such as hexane, heptane, octane, toluene, xylene, ethylbenzene, cyclohexane, and methylcyclohexane; ester-based organic solvents, such as ethyl acetate, butyl acetate, acetic acid-2-methoxyethyl, and acetic acid-2-ethoxyethyl; alcohol-based organic solvents, such as methyl alcohol, ethyl alcohol, normal propyl alcohol, isopropyl alcohol, isobutyl alcohol, ethylene glycol, and propylene glycol; ketone-based organic solvents, such as acetone, methyl ethyl ketone, methyl isobutyl ketone, and cyclohexanone; ether-based organic solvents, such as diethyl ether, dioxane, and tetrahydrofuran; chlorine-based organic solvents, such as dichloromethane, carbon tetrachloride, trichloroethylene, and tetrachloroethylene; inorganic solvents, such as water; and the like. These solvents (or dispersion media) can be used singly or in a combination of two or more.

Examples of the printing method for forming the picture pattern layer include gravure printing, offset printing, screen printing, flexo printing, electrostatic printing, ink jet printing, etc. When a solid-like picture pattern layer is formed over the entire surface, various coating methods, such as roll coating, knife coating, air-knife coating, dye coating, lip coating, comma coating, kiss coating, flow coating, and dip coating, can be used. In addition to the above, usable examples include hand-drawing methods, marbling methods, photographic methods, transfer methods, laser beam drawing methods, electron beam drawing methods, metal partial deposition methods, etching methods, etc. Such methods may be used in combination with other methods.

The thickness of the picture pattern layer is not particularly limited, and can be suitably determined according to product characteristics. The layer thickness during coating is about 1 µm or more and 15 µm or less, and the layer thickness after drying is about 0.1 µm or more and 10 µm or less.

Adhesive Layer

In order to increase the adhesion between the transparent resin layer and the picture pattern layer, an adhesive layer may be formed on the picture pattern layer. The adhesive layer is preferably a transparent adhesive layer. The transparent adhesive layer may be any of colorless transparent, colored transparent, semitransparent, etc.

The adhesive is not particularly limited, and any adhesive known in the field of decorative sheets can be used. Examples of adhesives known in the field of decorative sheets include thermoplastic resins, such as polyamide resin, acrylic resin, and vinyl acetate resin; thermosetting resins, such as urethane-based resin; and the like. These adhesives can be used singly or in a combination of two or more. It is also possible to use a two-component curable polyurethane resin containing isocyanate as a curing agent or a polyester resin.

Although the thickness of the adhesive layer is not particularly limited, the thickness after drying is about 0.1 µm or more and 30 µm or less, and preferably about 1 µm or more and 20 µm or less.

Transparent Resin Layer

The decorative sheet of the present invention may have a transparent resin layer.

The transparent resin layer is not particularly limited as long as it is transparent, and can be colorless transparent, colored transparent, semitransparent, or the like. Examples of the resin that constitutes the transparent resin layer include polyethylene, ethylene-α olefin copolymers, polypropylene, polymethylpentene, polybutene, ethylene-propylene copolymers, propylene-butene copolymers, ethylene-vinyl acetate copolymers, saponified products of ethylene-vinyl acetate copolymers, ethylene-(meth)acrylic acid copolymers, ethylene-(meth)acrylic acid ester copolymers, and like olefin-based resins, polyethylene terephthalate, polybutylene terephthalate, polyamide, ionomers, acrylic acid ester-based polymers, methacrylic acid ester-based polymers, polycarbonate, cellulose triacetate, and the like. These resins may be used singly or in a combination of two or more.

The transparent resin layer preferably contains an olefin-based resin, typified by polypropylene resin. It is more preferable that the resin that constitutes the transparent resin layer is an olefin-based resin mentioned above.

The transparent resin layer may be colored, as long as it is transparent; however, it is particularly desirable that no colorant be mixed.

The thickness of the transparent resin layer is generally about 20 µm or more and 200 µm or less. The thickness of the transparent resin layer may exceed the above range, depending on the application etc. of the sheet.

Primer Layer

A primer layer may be provided on the transparent resin layer. The primer layer can be formed by applying a known primer agent to the surface of the transparent resin layer. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay; flame retardants, such as magnesium hydroxide; antioxidants; lubricants; foaming agents; ultraviolet absorbers; light stabilizers; etc. The amount of additives can be suitably determined according to product characteristics.

The coating amount of the primer agent is not particularly limited, and is generally about 0.1 g/m$^2$ or more and 100 g/m$^2$ or less, and preferably about 0.1 g/m$^2$ or more and 50 g/m$^2$ or less.

The thickness of the primer layer is not particularly limited, and is generally about 0.01 µm or more and 10 µm or less, and preferably about 0.1 µm or more and 1 µm or less.

Gloss-Adjusting Layer

The decorative sheet of the present invention may have a gloss-adjusting layer. The presence of the gloss-adjusting layer makes it possible to adjust the gloss seen on the surface of the decorative sheet of the present invention, making it possible to further increase the designability.

The gloss-adjusting layer is preferably formed below the surface-protecting layer. For example, it is preferable that the gloss-adjusting layer be formed between the transparent resin layer and the surface-protecting layer.

As long as the design of the base layer is not deteriorated, the gloss-adjusting layer may be adjusted to be colorless transparent, colored transparent, or semitransparent.

Examples of the resin that constitutes the gloss-adjusting layer include polyvinyl butyral resins, urethane resins, acrylic resins, acrylic-urethane copolymer resins, a two-component curable polyurethane resin containing isocyanate as a curing agent, and the like.

The gloss-adjusting layer may contain a known primer agent to increase the adhesion with the transparent resin layer or the surface-protecting layer. In this case, the gloss-adjusting layer has a primer effect, as well as a gloss adjusting effect. Examples of primer agents for forming such a layer include urethane resin primer agents comprising an acrylic-modified urethane resin, etc., resin primer agents comprising a block copolymer of acrylic and urethane, and the like.

The resin components for forming the gloss-adjusting layer may be used singly or in a combination of two or more.

The gloss-adjusting layer may contain a filler for adjusting the gloss. Examples of fillers include silica, talc, clay, barium sulfate, barium carbonate, calcium sulfate, calcium carbonate, magnesium carbonate, and the like. The amount of the filler is preferably 0.1 parts by weight or more and 50 parts by weight or less, and more preferably 10 parts by weight or more and 40 parts by weight or less, based on 100 parts by weight of the resin component.

The gloss-adjusting layer may contain additives, such as coloring pigments, flame retardants, antioxidants, lubricants, foaming agents, ultraviolet absorbers, and light stabilizers, as required.

The thickness of the gloss-adjusting layer is not particularly limited. The thickness is generally about 0.1 µm or more and 100 µm or less, and preferably about 0.5 µm or more and 15 µm or less.

The glossiness (60° gloss value) of the gloss-adjusting layer is preferably a value different from the glossiness (60° gloss value) of the surface-protecting layer. In this specification, the glossiness (60° gloss value) is a value measured in accordance with JIS Z-8741 using a gloss meter. As the gloss meter, for example, GMX-202 produced by Murakami Color Research Laboratory) may be used.

Examples of the method for adjusting the glossiness (60° gloss value) of the gloss-adjusting layer include a method for adding a filler mentioned above to the resin component for forming the gloss-adjusting layer; a method for suitably changing the composition of the resin components; and the like.

Back-Surface Primer Layer

A back-surface primer layer may be formed on the back surface (the surface opposite to the surface on which the picture pattern layer is laminated) of the base material sheet, as required. For example, the back-surface primer layer is effective when the decorative sheet and an adherend are laminated to form a decorative plate.

The back-surface primer layer can be formed by applying a known primer agent to the base material sheet. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay, flame retardants, such as magnesium hydroxide, antioxidants, lubricants, foaming agents, ultraviolet absorbers, light stabilizers, etc. The amount of additives can be suitably determined according to product characteristics.

The coating amount of the primer agent is not particularly limited, and is generally about 0.1 g/m$^2$ or more and 100 g/m$^2$ or less, and preferably about 0.1 g/m$^2$ or more and 50 g/m$^2$ or less.

The thickness of the back-surface primer layer is not particularly limited, but is generally about 0.01 µm or more and 10 µm or less, and preferably about 0.1 µm or more and 1 µm or less.

Backer Layer

A backer layer (a synthetic resin layer for improving impact resistance and reducing the effect of an adherend) is optionally provided on the back surface of the base material sheet (when the picture pattern layer is present on the back surface of the base material sheet, then on the back surface of the picture pattern layer). The impact resistance refers to the resistance to the formation of dents when a load is partially applied. Although the decorative sheet of the present invention has sufficient impact resistance even without a backer layer, the presence of a backer layer can further improve various types of performance, including impact resistance.

The backer layer is suitably formed by subjecting a molten resin to extrusion molding. For example, extrusion molding using a T-die is suitable.

Examples of the method for bonding the back surface of the base material sheet and the backer layer include a method for bonding, by heat welding, the base material sheet and a backer layer obtained by subjecting a molten resin to extrusion molding; a method of providing an adhesive layer (and further a primer layer, if required) between the base material sheet and the backer layer to achieve bonding; and the like.

Examples of the resin that constitutes the backer layer include, but are not limited to, thermoplastic resins, such as polyethylene, polypropylene (PP), polyvinyl alcohol, ethylene-vinyl alcohol copolymers, polymethylene, polymethylpentene, polyethylene terephthalate, amorphous polyethylene terephthalate (A-PET), highly thermal resistant polyalkylene terephthalates (e.g., PET-G, product name (produced by Eastman Chemical Company), which is polyethylene terephthalate in which a part of the ethylene glycol is substituted by 1,4-cyclohexane dimethanol, diethylene glycol, or the like), polybutylene terephthalate (PBT), polycarbonate, polyarylate, polyethylene naphthalate, polyethylene naphthalate-isophthalate copolymers, polyimide, polystyrene, polyamide, ABS (acrylonitrile-butadiene-styrene copolymers), and the like. These resins may be used singly or in a combination of two or more.

The thickness of the backer layer can be suitably determined depending on the application of the final product, the method of use of the final product, etc. The thickness is generally 100 μm or more and 800 μm or less. Within this range, the thickness is more preferably 100 μm or more and 600 μm or less.

The adhesion surface of the backer layer may be subjected to a known adhesion-enhancing treatment, such as corona discharge treatment, plasma treatment, degreasing treatment, or surface-roughening treatment, as required. Moreover, in consideration of the adhesion with an adherend, a primer layer may be further provided on the back surface of the backer layer.

Embossing

As long as the decorative sheet of the present invention satisfies the requirements described in (1) to (3) above, embossing may be performed on the uppermost surface layer of the decorative sheet, as required. When the surface-protecting layer does not contain a matting agent, a concave-convex shape that satisfies the requirements described in (1) to (3) above may be formed on the surface of the decorative sheet with an embossing plate.

The embossing method is not particularly limited. For examples, a method in which the front surface of the surface-protecting layer is softened by heating, and pressed and shaped using an embossing plate, followed by cooling, is preferable. Depending on the material of the decorative sheet, which is a final product, or the surface-protecting layer, for example, the front surface of the transparent resin layer may be softened by heating, and pressed and shaped using an embossing plate, and then a surface-protecting layer may be formed thereon.

The embossing is conducted using a known sheet-fed or rotary embossing machine. Examples of concave-convex shapes include textile surface textures, plaster wall patterns, leather grain patterns, check patterns, bark patterns, grain patterns, stone sheet surface concave-convex patterns (granite cleavage planes, etc.), moth-eye patterns, and the like.

2. Decorative Plate of the Present Invention

Figure 2:
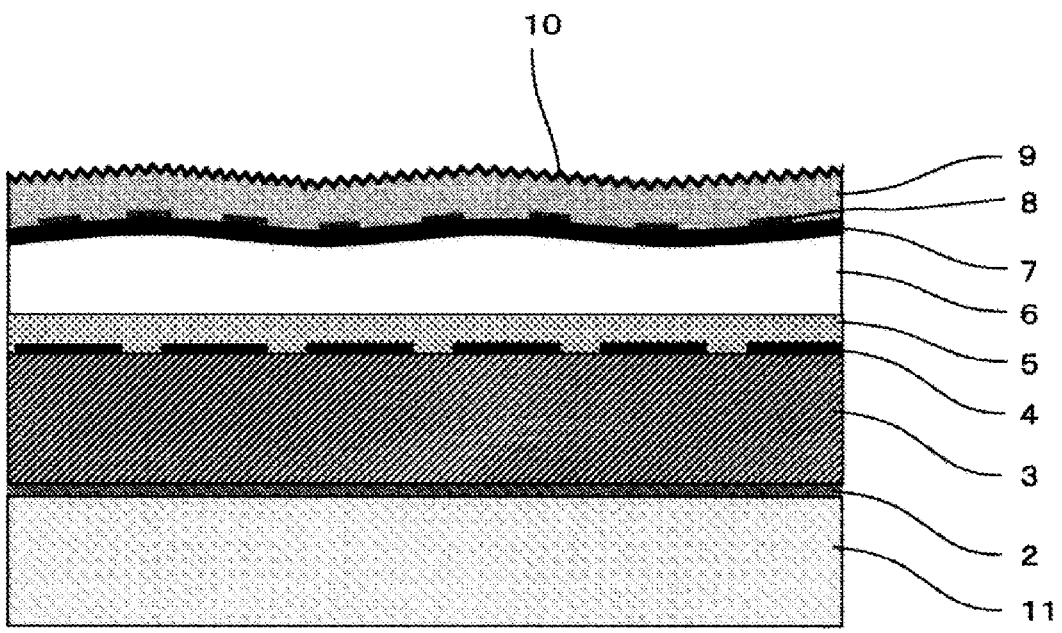
FIG. 2 is a cross-sectional view showing an example of the decorative plate of the present invention.

A decorative plate may be obtained by laminating the decorative sheet described above on an adherend. FIG. 2 is a cross-sectional view showing an example of the decorative plate of the present invention. In FIG. 2, the decorative plate of the present invention has an adherend 11 on the side opposite to the surface-protecting layer 9 of the decorative sheet. The adherend is not limited, and adherends used for known decorative plates can be used. Examples of the adherend include wood-based materials, metal, ceramics, plastics, glass, and the like. In particular, wood-based materials can be preferably used for the decorative sheet above. Specific examples of wood-based materials include sliced veneers, single panels, plywood panels, particleboards, medium-density fiberboards (MDF), chipboards, composite base materials in which a chipboard is laminated, and the like formed from various materials, such as Japanese cedar, Japanese cypress, zelkova, pine, lauan, teak, and melapi. Preferred wood-based materials are plywood panels, particleboards, and medium-density fiberboards (MDF).

The method for laminating the decorative sheet and an adherend is not limited. For example, the decorative sheet can be bonded to an adherend using an adhesive. The adhesive may be suitably selected from known adhesives depending on the type of adherend etc. Examples thereof include polyvinyl acetate, polyvinyl chloride, vinyl chloride-vinyl acetate copolymers, ethylene-acrylic acid copolymers, ionomer, butadiene-acrylonitrile rubber, neoprene rubber, natural rubber, and the like. These adhesives can be used singly or in a combination of two or more.

The thus-produced decorative plate can be used, for example, for interior materials of buildings, such as walls, ceilings, and floors; exterior materials, such as balconies and verandas; surface decorative plates of fittings, such as sashes, doors, and balustrades, and furniture; surface decorative plates of cabinets of light electrical appliances and office automation equipment; or the like. In particular, the decorative plate can be preferably used as a floor decorative material.

EXAMPLES

The following describes the present invention in detail with reference to Examples and Comparative Examples. However, the present invention is not limited to the embodiments of the Examples.

Production of Decorative Sheet

Example 1

A primer layer (back-surface primer layer) was provided on the back surface of a base material sheet comprising a 60-μm thick colored polypropylene film. Next, a picture pattern layer was formed by printing on the front surface of the base material sheet, and an adhesive layer was further formed on the picture pattern layer. Next, an 80-μm-thick sheet of transparent polypropylene-based resin was laminated on the adhesive layer by an extrusion lamination method to form a transparent resin layer. Subsequently, the surface of the transparent polypropylene-based resin sheet was subjected to a corona discharge treatment, and then coated with a two-component curable urethane resin to form a primer layer.

Thereafter, a surface-protecting layer-forming resin composition comprising 100 parts by mass of a urethane acrylate-based electron beam-curable resin (EB resin) and 16 parts by mass of silica (a mode diameter of 2 μm or more and 4 μm or less) as an inorganic filler was applied to the front surface of the primer layer by a gravure coating method to form a coating film (13 μm). Then, the coating film was cured by irradiation with an electron beam using an electron beam irradiation device in an environment with an oxygen concentration of 200 ppm or less at an acceleration voltage of 175 KeV with a dose of 5 rad. Thus, a surface-protecting layer was formed.

Further, the surface-protecting layer side was heated with a non-contact type infrared heater to thereby soften the base material sheet and the transparent resin layer, and embossing was immediately conducted by hot pressing to form a concavo-convex pattern. Thus, a decorative sheet was produced.

Example 2

A decorative sheet was produced as in Example 1, except that the surface-protecting layer had a structure that did not contain silica, and that the surface shape exhibited the measured values shown in Table 1.

Example 3

As the underlayer of the surface-protecting layer, a 3-μm-thick gloss-adjusting layer was formed by gravure coating using a coloring ink. The coloring ink had a composition comprising 7.5 mass % of ocher (iron oxide) as a coloring pigment and 7 mass % of silica (a mode diameter of 3 μm or more and 5 μm or less), based on 100 mass % of a vehicle containing 6.0 mass % of polyvinyl butyral resin. The surface shape was thus allowed to exhibit the measured values shown in Table 1.

Except for the above, the same procedure was performed as in Example 1 to produce a decorative sheet.

Example 4

A decorative sheet was produced as in Example 1, except that a thermosetting resin was used as a resin for the surface-protecting layer-forming resin composition, and that the surface shape exhibited the measured values shown in Table 1.

Example 5

A decorative sheet was produced as in Example 1, except that alumina (a mode diameter of 2 μm or more and 4 μm or less) was used as an inorganic filler, and that surface shape exhibited the measured values shown in Table 1.

Example 6

A decorative sheet was produced as in Example 1, except that the surface-protecting layer had a structure that did not contain an inorganic filler, that the shape of the embossing plate was changed, and that the surface shape exhibited the measured values shown in Table 1.

Example 7

A decorative sheet was produced as in Example 1, except that the surface-protecting layer had a structure that did not contain an inorganic filler, that the shape of the embossing plate was changed, and that the surface shape exhibited the measured values shown in Table 1.

Comparative Example 1

A decorative sheet was produced as in Example 1, except that the amount of silica (a mode diameter of 2 μm or more and 4 μm or less) contained in the surface-protecting layer-forming resin composition was changed to 34 parts by mass, and that the surface shape exhibited the measured values shown in Table 2.

Comparative Example 2

A decorative sheet was produced as in Example 1, except that the amount of silica (a mode diameter of 9 μm or more and 11 μm or less) contained in the surface-protecting layer-forming resin composition was changed to 8 parts by mass, and that the surface shape exhibited the measured values shown in Table 2.

Comparative Example 3

A decorative sheet was produced as in Example 1, except that the amount of silica (a mode diameter of 9 μm or more and 11 μm or less) contained in the surface-protecting layer-forming resin composition was changed to 16 parts by mass, and that the surface shape exhibited the measured values shown in Table 2.

Comparative Example 4

A decorative sheet was produced as in Example 1, except that the amount of silica (a mode diameter of 9 μm or more and 11 μm or less) contained in the surface-protecting layer-forming resin composition was changed to 8 parts by mass, that the shape of the embossing plate was changed, and that the surface shape exhibited the measured values shown in Table 2.

Comparative Example 5

A decorative sheet was produced as in Example 1, except that the amount of silica (a mode diameter of 9 μm or more and 11 μm or less) contained in the surface-protecting layer-forming resin composition was changed to 16 parts by mass, that the shape of the embossing plate was changed, and that the surface shape exhibited the measured values shown in Table 2.

Comparative Example 6

A decorative sheet was produced as in Example 1, except that the shape of the embossing plate was changed, and that the surface shape exhibited the measured values shown in Table 2.

Comparative Example 7

A decorative sheet was produced as in Example 1, except that the shape of the embossing plate was changed, and that the surface shape exhibited the measured values shown in Table 2.

Production of Decorative Plate

In each Example and each Comparative Example, a 2.5-mm thick medium-density wood fiberboard (MDF) was uniformly coated with an aqueous emulsion adhesive (Rikabond BA-10L (main agent): BA-11B (curing agent, produced by Chirika Co., Ltd.)=100:2.5 (mass ratio)) in an amount of 80 g/m², and the decorative sheet was placed thereon to be bonded together, followed by curing at room temperature for three days, thereby producing a decorative plate.

The surface shape of the thus-produced decorative sheets of the Examples and Comparative Examples was measured by the following measurement methods. The measurement was performed by using a surface roughness measuring apparatus (SURFCOM FLEX-50A, product name, produced by Tokyo Seimitsu Co., Ltd.) at a measurement rate of 0.6 mm/s.

(1) Ra(i)/Ra(ii)

A portion with a length of 5 cm and a width of 5 cm was arbitrarily selected on the surface of the surface-protecting layer. Within this portion, 5 points were arbitrarily selected, an arithmetic average roughness Ra was first measured in one direction from each of the 5 points, under measurement conditions in accordance with JIS B0633:2001 and by a measurement method in accordance with JIS B0601:2001, and the average value of the 5 points was obtained as Ra(i).

Next, within the portion, 5 points were arbitrarily selected, and an arithmetic average roughness Ra was measured in the same manner along the direction perpendicular to the direction for measuring Ra(i) above, and the average value of the 5 points was obtained as Ra(ii). Then, Ra(i)/Ra(ii) was calculated based on the Ra(i) and Ra(ii) values obtained accordingly.

(2) RSm(i)/RSm(ii)

A portion with a length of 5 cm and a width of 5 cm was arbitrarily selected on the surface of the surface-protecting layer. Within this portion, 5 points were arbitrarily selected, each mean width of the roughness profile elements RSm was measured in an arbitrarily given direction, under measurement conditions in accordance with JIS B0633:2001 and by a measurement method in accordance with JIS B0601:2001, and the average value of the 5 points was obtained as RSm(i).

Next, 5 points were arbitrarily selected, each mean width of the roughness profile elements RSm was measured in the same manner along the direction perpendicular to the direction for measuring the Rsm(i) above, and the average value of the 5 points was obtained as RSm(ii).

Then, RSm(i)/RSm(ii) was calculated based on the measured RSm(i) and RSm(ii) values.

(3) Ra and RSm at a Cutoff Value ($\lambda c$) of 0.08 mm

A portion with a length of 5 cm and a width of 5 cm was arbitrarily selected on the surface of the surface-protecting layer. Within this portion, 5 points were arbitrarily selected, and an arithmetic average roughness Ra(i) and a mean width of the roughness profile elements RSm(i) were measured in an arbitrarily given direction, by a measurement method in accordance with JIS B0601:2001 while setting the evaluation length to 0.4 mm and the cutoff value ($\lambda c$) of a surface roughness measuring apparatus to 0.08 mm.

Next, 5 points were arbitrarily selected, and an arithmetic average roughness Ra(ii) and a mean width of the roughness profile elements RSm(ii) were measured in a similar manner in the perpendicular direction to the arbitrarily given direction for measuring the Ra(i) and RSm(i) by the measurement method in accordance with JIS B0601:2001 while setting the evaluation length to 0.4 mm and the cutoff value ($\lambda c$) of a surface roughness measuring apparatus to 0.08 mm. The average value of 10 points in total, i.e., the measured Ra(i) based on the 5 points and the measured Ra(ii) based on the 5 points, was calculated to obtain an arithmetic average roughness Ra measured at a cutoff value ($\lambda c$) of 0.08 mm with an evaluation length of 0.4 mm. Additionally, the average value of 10 points in total, i.e., the measured RSm(i) based on the 5 points and the measured RSm(ii) based on the 5 points, was calculated to obtain a mean width of the roughness profile elements RSm measured at a cutoff value ($\lambda c$) of 0.08 mm with an evaluation length of 0.4 mm.

The properties of the thus-produced decorative sheets and decorative plates of the Examples and Comparative Examples were evaluated by the following methods.

(1) Easy Cleanability

Wheat flour was sprinkled over the entire surface of the decorative sheet. Subsequently, a rubber contact piece was rotated three times under a load of 300 g/cm$^2$ in one direction to create a dirt portion for evaluation. Then, the portion was wiped once in one direction with a dust cloth (towel cloth) moistened with water, so as to remove the remaining dirt made of wheat flour, and the decorative sheet surface after wiping was evaluated in accordance with the following criteria. In the following evaluation criteria, an evaluation of A is considered to be satisfactory for practical use.

A: No dirt remaining
B: Dirt slightly remaining on the entire surface
C: Dirt remaining on the entire surface (2) Gloss The decorative sheet was placed on a horizontal table in such a manner that the surface-protecting layer was facing upward, and the surface of the decorative sheet was irradiated with a fluorescent lamp at an angle of 45 degrees. The decorative sheet surface was visually observed from the regular reflection direction of the fluorescent lamp, and the state of gloss was evaluated.

(3) Impact Resistance (Du Pont Impact Test)

A punch with a radius of 6.5 mm and a load of 500 g was dropped from a height of 30 cm onto the surface of the decorative plate on the side on which the decorative sheet was laminated, and the conspicuity of the scratch on the decorative sheet surface was visually observed. The evaluation was performed in accordance with the following criteria. In the following evaluation criteria, an evaluation of A or higher is considered to be satisfactory for practical use.

A+: the scratch was not noticeable at all
A: the scratch was not easily noticeable
B: the scratch was noticeable
C: the scratch was very noticeable (4) Scratch Resistance Test (Hoffman Scratch Test)

Each decorative plate was subjected to a test using a Hoffman scratch tester (produced by BYK-Gardner, U.S.A.). Specifically, a scratch knife (7-mm-diameter cylindrical knife) was set to be in contact with the surface of the decorative sheet of the decorative plate at an angle of 45°, and the tester was moved on the decorative plate. The load (spindle) was gradually increased, and the test was repeated until scratches, impressions, etc., were formed on the surface of the decorative plate. The results were evaluated according to the following criteria. In the following evaluation criteria, an evaluation of B or higher is considered to be satisfactory for practical use.

A: No scratches were found at a load of 400 g or more.
B: No scratches ere found at a load of 300 g or more and less than 400 g.
C: Scratches were formed at a load of less than 300 g.

Tables 1 and 2 show the results.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Surface-protecting layer | Thickness (μm) | 13 | 13 | 13 | 13 | 13 | 13 | 13 |
| | Inorganic filler | Silica | — | Silica | Silica | Alumina | — | — |
| | Mode diameter of inorganic filler (μm) | 3 | — | 3 | 3 | 3 | — | — |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
|  | Amount of inorganic filler (parts by mass based on 100 parts by mass of the resin) | 16 | — | 16 | 16 | 16 | — | — |
|  | Resin | Ionizing radiation curable | Ionizing radiation curable | Ionizing radiation curable | Thermosetting | Ionizing radiation curable | Ionizing radiation curable | Ionizing radiation curable |
| Surface roughness | (1) Ra(i)/Ra(ii) | 0.99 | 1.06 | 1.02 | 1.21 | 1.14 | 1.08 | 1.02 |
|  | (2) RSm(i)/RSm(ii) | 1.06 | 1.07 | 1.07 | 1.10 | 1.08 | 1.05 | 1.06 |
|  | (3) Ra, RSm (cutoff value (λc) 0.08 mm) Ra (μm) | 0.26 | 0.29 | 0.28 | 0.29 | 0.32 | 0.05 | 0.38 |
|  | RSm (μm) | 31.28 | 34.30 | 32.92 | 33.26 | 33.61 | 24.12 | 380.05 |
|  | Gloss-adjusting layer | No | No | Yes | No | No | No | No |
|  | Easy cleanability | A | A | A | A | A | A | A |
|  | Gloss | High gloss | High gloss | Low gloss | High gloss | High gloss | High gloss | High gloss |
|  | Impact resistance (Du Pont impact test) | A | A | A+ | A | A | A | A |
|  | Scratch resistance (Hoffman scratch test) | A | A | A | B | A | A | A |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Surface-protecting layer | Thickness (μm) | 13 | 13 | 13 | 13 | 13 | 13 | 13 |
|  | Inorganic filler | Silica | Silica | Silica | Silica | Silica | Silica | Silica |
|  | Mode diameter of inorganic filler (μm) | 3 | 10 | 10 | 10 | 10 | 3 | 3 |
|  | Amount of inorganic filler (parts by mass based on 100 parts by mass of the resin) | 34 | 8 | 16 | 8 | 16 | 16 | 16 |
|  | Resin | Ionizing radiation curable | Ionizing radiation curable | Ionizing radiation curable | Ionizing radiation curable | Ionizing radiation curable | Ionizing radiation curable | Ionizing radiation curable |
| Surface roughness | (1) Ra(i)/Ra(ii) | 1.15 | 1.16 | 1.05 | 1.64 | 0.60 | 1.35 | 1.69 |
|  | (2) RSm(i)/RSm(ii) | 1.01 | 0.97 | 1.00 | 1.34 | 0.66 | 1.40 | 1.19 |
|  | (3) Ra, RSm (cutoff value (λc) 0.08 mm) Ra (μm) | 0.29 | 0.44 | 0.65 | 0.41 | 0.66 | 0.30 | 0.32 |
|  | RSm (μm) | 18.47 | 32.44 | 21.42 | 32.28 | 22.89 | 33.29 | 31.88 |
|  | Gloss-adjusting layer | No | No | No | No | No | No | No |
|  | Easy cleanability | B | B | C | B | C | A | A |
|  | Gloss | Low gloss | High gloss | Low gloss | High gloss | Low gloss | High gloss | High gloss |
|  | Impact resistance (Du Pont impact test) | A+ | A | A+ | C | B | B | B |
|  | Scratch resistance (Hoffman scratch test) | A | A | A | A | A | A | A |

EXPLANATION OF REFERENCE NUMERALS

1. Decorative Sheet
2. Back-surface Primer Layer
3. Base Material Sheet
4. Picture Pattern Layer
5. Adhesive Layer
6. Transparent Resin Layer
7. Primer Layer
8. Gloss-adjusting Layer
9. Surface-protecting Layer
10. Micro Concave-Convex Surface Shape
11. Adherend

The invention claimed is:

1. A decorative sheet having a surface-protecting layer on the uppermost surface of the decorative sheet,
   wherein the surface-protecting layer contains an inorganic filler, and the inorganic filler having a mode diameter of about 2 μm or more and 10 μm or less;
   wherein the inorganic filler is at least one member selected from the group consisting of silica, alumina, and glass powder;
   wherein the inorganic filler content is 30 parts by mass or less, based on 100 parts by mass of the resin that constitutes the surface-protecting layer;
   wherein the surface-protecting layer has a wavy shape as a concave-convex pattern and comprises a micro concave-convex surface shape on its entire surface, and
   wherein (1) Ra(i)/Ra(ii) is 0.62 or more and 1.63 or less, the Ra(i)/Ra(ii) being calculated using an arithmetic average roughness Ra(i) measured along an arbitrary direction on the surface of the surface-protecting layer, and an arithmetic average roughness Ra(ii) measured along the perpendicular direction to the arbitrary direction, under measurement conditions in accordance with JIS B0633:2001 and by a measurement method in accordance with JIS B0601:2001;
   (2) RSm(i)/RSm(ii) is 0.75 or more and 1.33 or less, the RSm(i)/RSm(ii) being calculated using a mean width of roughness profile elements RSm(i) measured along an arbitrary direction on the surface of the surface-protecting layer, and a mean width of roughness profile elements RSm(ii) measured along the perpendicular direction to the arbitrary direction, under measurement conditions in accordance with JIS B0633:2001 and by a measurement method in accordance with JIS B0601:2001; and (3) an arithmetic average roughness Ra measured on the surface of the surface-protecting layer at a cutoff value (λc) of 0.08 mm with an evaluation length of 0.4 mm by a measurement method in accordance with JIS B0601:2001 is 0.05 μm or more and 0.40 μm or less, and a mean width of roughness profile elements RSm measured on the surface of the surface-protecting layer at a cutoff value (λc) of 0.08 mm with an evaluation length of 0.4 mm by a measurement method in accordance with JIS B0601:2001 is 22.90 μm or more and 380.05 μm or less.

2. The decorative sheet according to claim 1, wherein a resin constituting the surface-protecting layer is an ionizing radiation-curable resin.

3. The decorative sheet according to claim 1, further having a gloss-adjusting layer.

4. A decorative plate having an adherend on a surface opposite to the surface-protecting layer of the decorative sheet of claim 1.

5. The decorative sheet according to claim 2, further having a gloss-adjusting layer.

6. A decorative plate having an adherend on a surface opposite to the surface-protecting layer of the decorative sheet of claim 2.

7. A decorative plate having an adherend on a surface opposite to the surface-protecting layer of the decorative sheet of claim 3.

8. A decorative plate having an adherend on a surface opposite to the surface-protecting layer of the decorative sheet of claim 5.

9. The decorative sheet according to claim 3, wherein the gloss-adjusting layer contains a filler.

10. The decorative sheet according to claim 9, wherein the amount of the filler is 0.1 parts by mass or more and 50 parts by mass or less, based on 100 parts by mass of a resin component.

11. The decorative sheet according to claim 5, wherein the gloss-adjusting layer contains a filler.

12. The decorative sheet according to claim 11, wherein the amount of the filler is 0.1 parts by mass or more and 50 parts by mass or less, based on 100 parts by mass of a resin component.

13. The decorative sheet according to claim 1, wherein the arithmetic average roughness Ra measured on the surface of the surface-protecting layer at a cutoff value (λc) of 0.08 mm with an evaluation length of 0.4 mm by a measurement method in accordance with JIS B0601:2001 is 0.10 μm or more and 0.40 μm or less.

14. The decorative sheet according to claim 1, wherein the mean width of roughness profile elements RSm measured on the surface of the surface-protecting layer at a cutoff value (λc) of 0.08 mm with an evaluation length of 0.4 mm by a measurement method in accordance with JIS B0601:2001 is 22.90 μm or more and 80.00 μm or less.

* * * * *